United States Patent [19]

Auvity

[11] Patent Number: 5,302,152

[45] Date of Patent: Apr. 12, 1994

[54] HEATING INSTALLATION FOR A MOTOR VEHICLE WITH SEPARATE LEFT AND RIGHT HAND AIR CIRCUITS

[75] Inventor: Michel Auvity, Velizy, France

[73] Assignee: Valeo, Le Mesnil-Saint Denis, France

[21] Appl. No.: 741,593

[22] Filed: Aug. 7, 1991

[30] Foreign Application Priority Data

Aug. 8, 1990 [FR] France ................................ 90 10147

[51] Int. Cl.$^5$ ............................................. B60S 1/54
[52] U.S. Cl. .................................................... 454/127
[58] Field of Search ......................... 454/121, 127, 126

[56] References Cited

U.S. PATENT DOCUMENTS 2,860,567 11/1958 Wilfert ................................. 454/126

FOREIGN PATENT DOCUMENTS 377746 7/1990 European Pat. Off. .
1934891 10/1965 Fed. Rep. of Germany .
3541284 11/1986 Fed. Rep. of Germany ...... 454/127

Primary Examiner—Harold Joyce
Attorney, Agent, or Firm—Longacre & White

[57] ABSTRACT

A heating installation for a motor vehicle is of the kind in which air, from two air processing circuits is delivered to the left hand and right hand halves of the vehicle cabin respectively, in such a way that the temperature of the air in the two halves of the vehicle can be adjusted so as to be different if required. The installation includes a moulded member defining four air streams between the outlets of the left and right hand processing circuits and a windshield de-icing/de-misting slot means, namely: a first flow path extending from the left hand circuit to a left hand slot region; a second flow path extending from the left hand circuit to the right hand slot region; a third flow path extending from the right hand circuit to the left hand slot region; and a fourth flow path extending from the right hand circuit to the right hand slot region. This removes any tendency for any unevenness of temperature as between the left and right hand halves of the windshield, in respect of the de-icing/de-misting air.

6 Claims, 2 Drawing Sheets

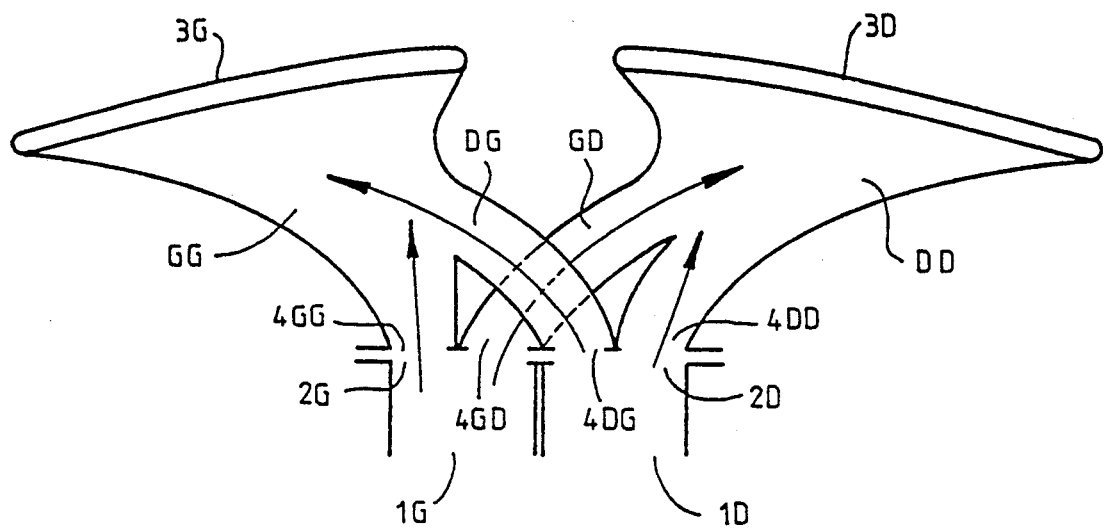
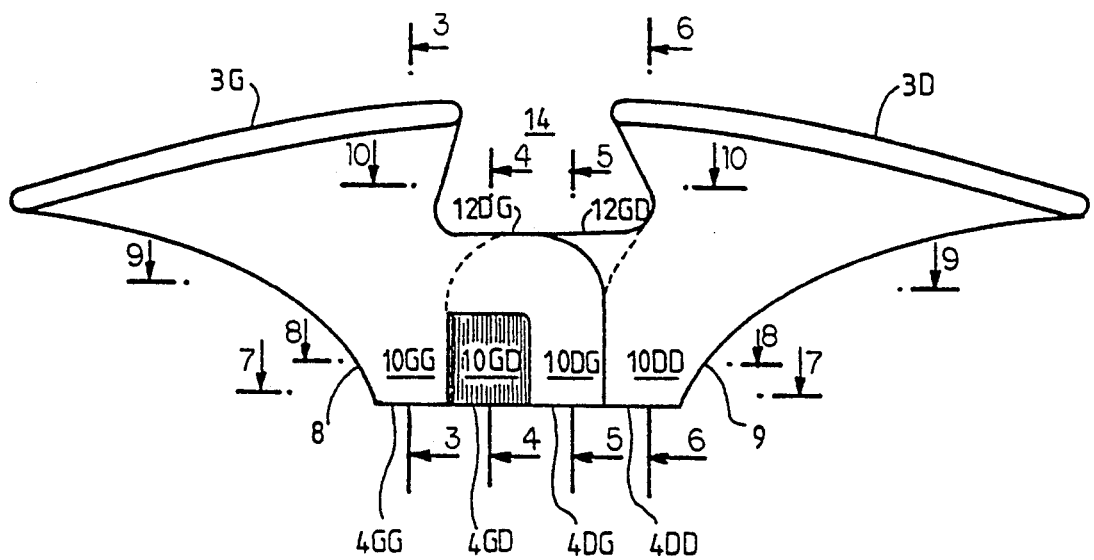

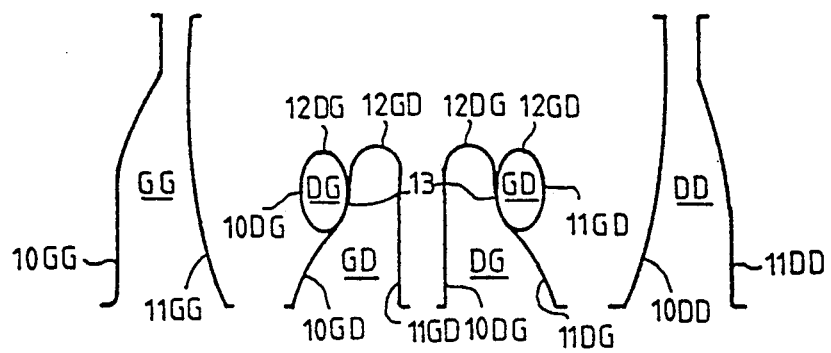
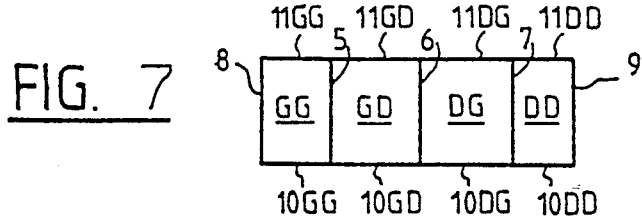
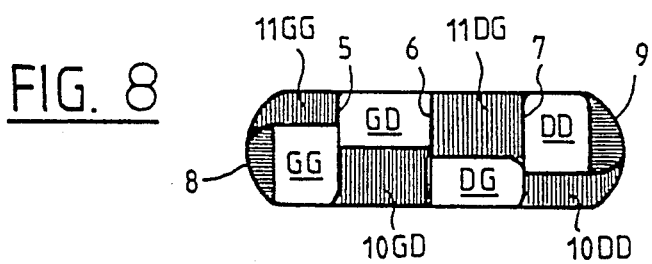
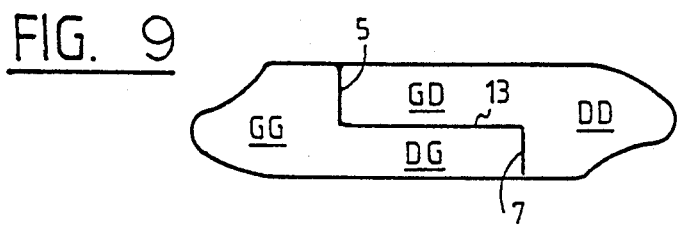
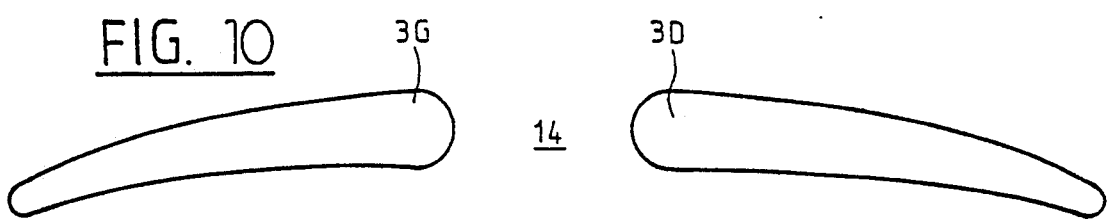

HEATING INSTALLATION FOR A MOTOR VEHICLE WITH SEPARATE LEFT AND RIGHT HAND AIR CIRCUITS

FIELD OF THE INVENTION

This invention relates to installations for motor vehicles, for the purposes of ventilation, or heating, or air conditioning, or for performing any one or more of these functions.

BACKGROUND OF THE INVENTION

For the comfort of occupants of the cabin of a motor vehicle when they require different air temperatures in the cabin, some vehicles have installations of the above kind which comprise means defining separate left and right hand circuits for the processing of the air which is to be delivered into the left and right hand halves of the cabin. In such an installation, independent adjustment is possible, as between the left hand half of the vehicle and its right hand half, of the temperature and other parameters. If the separate treatment circuits were to extend up to the slots that are provided for the purposes of de-icing or de-emisting of the windshield, the difference in temperature between the air delivered on the two sides of the windshield could under some circumstances involve insufficient de-icing or de-emisting taking place, or could even give rise to a situation in which de-emisting or de-icing occurs only on one half of the windshield.

DISCUSSION OF THE INVENTION

An object of the present invention is to use the processed air, delivered from the two separate processing circuits, for de-icing and/or de-emisting of the windshield but without the drawback mentioned above.

According to the invention, a ventilating and/or heating, or air conditioning, installation for a motor vehicle, comprising means defining separate circuits for processing air to be transmitted into the left and right hand halves of the cabin of the vehicle, namely a left hand circuit and a right hand circuit, and slot means comprising at least one de-icing and/or de-misting slot for directing the processed air towards the windshield of the vehicle, is characterised in that it further includes means defining four paths for the air between outlet apertures of the said left and right hand circuits and the slot means, namely a first flow path extending from an outlet aperture of the left hand circuit to a region of the slot means situated in the left hand half of the vehicle, a second flow path extending from the said outlet aperture to a region of the slot means situated in the right hand half of the vehicle, a third flow path extending from an outlet aperture of the right hand circuit to a region of the slot means situated in the left hand half of the vehicle, and a fourth flow path extending from the outlet aperture of the right hand circuit to a region of the slot means situated in the right hand half of the vehicle.

With this arrangement, air emerging from the slot means is at a substantially even temperature, both on the left hand side and on the right hand side of the cabin, regardless of any difference in temperature between the left and right hand halves of the cabin itself.

Preferably, the slot means includes two de-icing and-/or de-misting slots, which are situated in the left hand half and the right hand half respectively of the vehicle, with the said regions situated in the left hand half and the right hand half of the vehicle being associated with the two respective said slots.

In one form of installation according to the invention, the said means defining the four flow paths comprise a moulded member having thin walls, each adjacent to two of the said flow paths. The said moulded member preferably defines the four flow paths up to and including the said slot means.

Preferably, the moulded member includes four inlet apertures which are aligned with each other in the transverse direction, and which correspond to the first, second, third and fourth flow paths respectively, the said inlet apertures being joined to the said outlet apertures of the left and right hand circuits respectively, and being separated from each other by the said thin walls.

In one preferred form of installation in accordance with the invention, the second flow path and the third flow path extend firstly towards the respective region of the slot means from the corresponding inlet apertures, becoming narrower in opposite directions in the longitudinal direction of the vehicle, and then increasing in transverse area while being directed respectively towards the left and the right, with one of the said second and third flow paths passing in front of, and the other one behind, a separating wall which is oriented transversely, so as to cause the second and third flow paths to merge with the fourth flow path and the first flow path respectively.

Further features and advantages of the invention will appear more clearly from the description of a preferred embodiment of the invention which follows, given by way of example only and with reference to the accompanying drawings.

BRIEF DESCRIPTION OF THE DRAWINGS

FIG. 1 shows diagrammatically the principle involving four air streams in an installation in accordance with the invention.

FIG. 2 is a view in elevation of a moulded component defining these four flow paths.

FIGS. 3-10 are sections taken on the lines 3—3, 4—4, 5—5, 6—6 and 7—7 respectively in FIG. 2.

FIG. 8 is a view in cross section taken on the line 8—8 in FIG. 2.

FIGS. 9 and 10 are cross sections taken on the lines 9—9 and 10—10 in FIG. 2.

DESCRIPTION OF A PREFERRED EMBODIMENT OF THE INVENTION

The installation having four flow paths illustrated in the drawings includes means which are known per se and not shown, defining separate left hand and right hand circuits for suitable treatment or processing of the air. These circuits may, in particular, include a housing which contains one or more air blowers, one or more heat exchangers for heating and/or cooling the air, pivoting flap valves, and appropriate control equipment.

The separate processing circuits comprise, respectively, two output tubes 1G and 1D, terminating in outlet apertures 2G and 2D for processed air. This processed air is then delivered into two slots 3G and 3D, for de-icing and/or de-misting the windshield. The slots 3G and 3D are situated on the left hand side and the right hand side of the vehicle respectively. As is shown diagrammatically in FIG. 1, the installation includes four ducts defining respective air paths GG, GD, DG and DD, which connect the outlet apertures 2G and 2D variously with the slots 3G and 3D. More particularly, the paths GG and GD comprise respective inlet apertures 4GG and 4GD, which are juxtaposed to each other so as to be coincident with the aperture 2G, while the paths DG and DD include respective inlet apertures 4DG and 4DD which are juxtaposed to each other so as to be coincident with the outlet aperture 2D. The paths GG and DG are open downstream through the slot 3G, and the paths GD and DD are open downstream through the slot 3D.

Referring now to FIGS. 2 and 3A to 3H, these show a practical embodiment of the four paths and the two slots, all defined in a single monobloc moulded member.

As can be seen in FIGS. 2 and 3E, the inlet apertures 4GG, 4GD, 4DG and 4DD, and the paths GG, GD, DG and DD in the immediate vicinity of the latter, are aligned in that order in the transverse direction (i.e. from left to right in the drawings), and are separated from each other by thin walls 5, 6 and 7. The flow paths GG and GD are limited on the right and on the left by the outer walls 8 and 9 of the moulded member. On the rear side of the moulded member, i.e. on the side facing towards the interior of the vehicle cabin and visible in FIG. 2, the flow paths GG, GD, DG and DD are limited respectively by external wall portions 10GG, 10GD, 10DG and 10DD.

As is indicated in FIGS. 3A to 3D and FIG. 3F, the walls 5, 6, 7, and the wall portions 10GG and 10DG extend substantially vertically upwards from the plane of the inlet apertures 4GG and 4DD, that is to say they are parallel to the mean direction in which the air flows in the four paths taken together. By contrast, the walls 8 and 9 and the wall portions 10GD and 10DD are inclined with respect to that direction. More particularly, the wall 8 is divergent towards the left and the wall 9 is divergent towards the right, in order to direct the air stream on to the whole width of the corresponding slots 3G and 3D respectively. Similarly, the wall portion TODD is inclined towards the interior of the moulded member, so as to produce a progressive reduction in the transverse width of the flow path DD in the longitudinal direction of the vehicle, towards the slot 3D. The wall portion 10GD is similarly inclined inwardly, that is to say towards the front of the vehicle, in such a way as to leave, behind the flow path GD, a free space in which the flow path DG can extend generally horizontally at the level of the plane of the cross section G—G in FIG. 2. At this level, as can best be seen in FIG. 3G, the walls 6 and 7 are interrupted in the rear half, so as to enable the flow path GD to merge with the flow path DD.

On the front face of the moulded member, the flow paths GG, GD, DG and DD are bounded respectively by wall elements 11GG, 11GD, 11DG and 11DD, seen variously in FIGS. 3A to 3F. The wall elements 11GD and 11DD extend substantially vertically, as do the wall elements 10GG and 10DG, while the wall elements 11 GG and 11DG are inclined inwardly (as are the wall elements 10 GD and TODD). Similarly, the flow path GD is curved towards the horizontal, at the level of the plane of the cross section G—G in FIG. 2, in front of the flow path DG and above the inclined wall portion 11DG, and merges with the flow path GG where the walls 6 and 5 are interrupted. The wall elements 10GD and 11DG are extended upwardly by a transverse wall element 13 which separates the substantially horizontal portions of the flow paths DG and GD, and these horizontal wall portions are bounded at the top by further wall elements 12DG and 12GD which join the wall element 13 to the wall elements 10DG and 11GD respectively. Above the wall elements 12DG and 12GD there is a free space 14 outside the moulded member, which separates the slots 3G and 3D from each other (see FIGS. 2 and 3H). At this level, the wall elements 10GG and TODD are in turn inclined inwardly, so that the internal space of the moulded member is reduced progressively in transverse width i.e. its width in the longitudinal direction of the vehicle, down to the width of the slots 3G and 3D.

What is claimed is:

1. An installation for a motor vehicle for at least one of the functions selected from ventilation, heating and air conditioning, comprising means defining a left hand air processing circuit for processing air to be delivered into the left hand side of the cabin of the vehicle, means defining a right hand circuit, separate from the left hand circuit, for processing air to be delivered into the right hand half of the cabin, slot means comprising at least one de-icing/de-misting slot, for delivering the processed air towards a windshield of the vehicle, the installation further including means defining four flow paths for the air variously between the said air circuits and the slot means, the left hand circuit having a left hand outlet aperture and the right hand circuit having a right hand outlet aperture, and the slot means defining a left hand slot region and a right hand slot region situated in the left hand and right hand halves of the vehicle respectively, whereby the said flow paths comprise:
    a first flow path extending from the left hand outlet aperture to the left hand slot region;
    a second flow path extending from the left hand outlet aperture to the right hand slot region;
    a third flow path extending from the right hand outlet aperture to the left hand slot region; and
    a fourth flow path extending from the right hand outlet aperture to the right hand slot region.

2. An installation according to claim 1, wherein the slot means comprises two said slots, disposed in the left hand half and the right hand half of the vehicle respectively, the said left hand slot region being associated with the left hand slot and the said right hand slot region being associated with the right hand slot.

3. An installation according to claim 1, wherein the means defining the said four flow paths comprises a single moulded member defining thin walls, each of which is adjacent to two of the said flow paths.

4. An installation according to claim 3, wherein the said moulded member defines the four flow paths up to and including the said slot means.

5. An installation according to claim 3, wherein the moulded member defines four inlet apertures, mutually aligned in the transverse direction of the vehicle, with each inlet aperture defining the upstream end of a respective one of the four said flow paths, the inlet apertures being adapted to be joined to the said outlet apertures of the left and right hand circuits, and being separated from each other by the said thin walls.

6. An installation according to claim 5, wherein the said moulded member further includes a separating wall oriented transversely, the moulded member defining the said second and third flow paths such that they extend from the corresponding said inlet apertures towards the slot means, reducing in width in opposite senses in the longitudinal direction of the vehicle, and then increasing in cross sectional area and being directed respectively towards the left and towards the right, with one of the said second and third flow paths passing in front of the said separating wall, and the other passing behind the separating wall, so that the second and third flow paths then merge with the said fourth flow path and first flow path respectively.

* * * * *